Dec. 27, 1938.  J. V. UHERKOVICH  2,141,701

NUT LOCK

Filed April 1, 1937

Julius V. Uherkovich
INVENTOR

BY Victor J. Evans & Co.
ATTORNEYS

Patented Dec. 27, 1938

2,141,701

UNITED STATES PATENT OFFICE 2,141,701

NUT LOCK

Julius V. Uherkovich, Gary, Ind.

Application April 1, 1937, Serial No. 134,435

1 Claim. (Cl. 151—13)

The invention relates to nut locks and more especially ratchet acting nut locks.

The primary object of the invention is the provision of a nut lock of this character, wherein on the fastening of a nut carrying bolt in a piece of work the nut on the bolt can be turned in one direction for the secure fastening of the bolt in place without any liability of the nut working loose from its adjusted position and when it becomes necessary to loosen the nut or free the same from the bolt, such nut must be unlocked, the manner of locking of the nut on the bolt being novel and to allow the freeing of the nut it is necessary to release the follower washer which is slidably keyed to the bolt, provision being made for so doing.

Another object of the invention is the provision of a nut lock of this character, wherein the follower washer is interfitted with the nut in a manner to eliminate any possibility of undue separation of the said washer from the nut particularly where the nut carrying bolt is engaged in woodwork and shrinkage occurs in the latter and thus there is no possibility of the accidental loosening of the nut on the bolt which might possibly occur should there be a separation of the washer from the nut.

A further object of the invention is the provision of a nut lock of this character, wherein a nut is positively locked on adjustment upon a bolt without liability of the bolt becoming loose or free from work or the nut working off of the bolt.

A still further object of the invention is the provision of a nut lock of this character, wherein the nut proper and a washer are specially designed for coaction with each other and also with a bolt for the secure fastening of the bolt and nut in a piece of work without liability of the loosening of the bolt or nut when so fastened.

A still further object of the invention is the provision of a nut lock of this character, which is simple in its construction, thoroughly reliable and effective in operation, strong, durable, and inexpensive to manufacture.

With these and other objects in view, the invention consists in the features of construction, combination and arrangement of parts as will be hereinafter more fully described, illustrated in the accompanying drawing, which discloses the preferred and modified forms of embodiment of the invention and pointed out in the claim hereunto appended.

In the accompanying drawing.

Similar reference characters indicate corresponding parts throughout the several views in the drawing.

Figure 1:
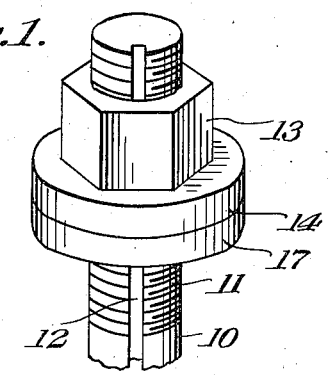
Figure 1 is a fragmentary perspective view of a bolt showing a nut lock constructed in accordance with the invention in association therewith.
Figure 2:
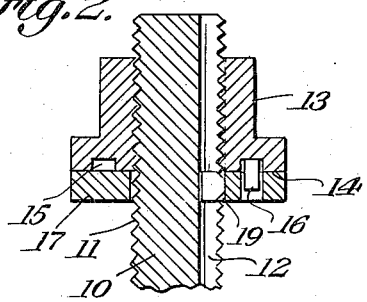
Figure 2 is a vertical longitudinal sectional view thereof.
Figure 3:
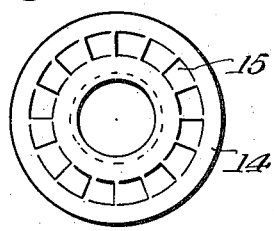
Figure 3 is a plan view of a nut looking toward the inner end thereof.
Figure 4:
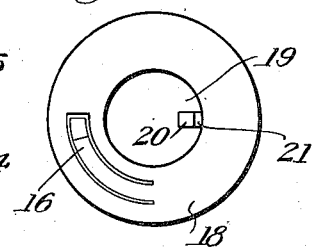
Figure 4 is a plan view of the washer for cooperation with the nut.
Figure 5:
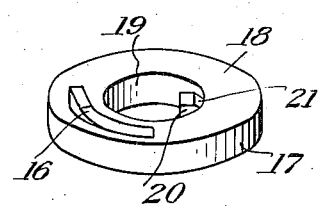
Figure 5 is a perspective view of the washer.

Referring to the drawing in detail, particularly Figures 1 to 5 inclusive, 10 designates generally a portion of the stem or shank of a bolt externally threaded at 11 and having longitudinally disposed therein a channel or groove forming a key way 12, this being conventional, while carried by the shank or stem 10 is an internally threaded nut 13 preferably externally flat faced for wrench engagement therewith. This nut 13 at the innermost end thereof is provided with an enlarged circular flat face 14 in which is cut an annular series of sunken ratchet teeth 15 being concentric to the stem or shank 10 of the bolt while coacting with the said teeth is a springy ratchet pawl or dog 16 cut and bent from a washer 17 to protrude from the face 18 thereof confronting the face 14 of the nut.

The washer 17 is formed with the usual central hole or opening 19 for accommodating the shank or stem 10 and projected into this hole or opening 19 is a shearing key or lug 20 accommodated within the slot or channel forming the key way 12 in the stem or shank 10. The key 20 next to the wall of the hole or opening 19 is weakened at 21 for easy shearing thereof so that the nut 14 when through ratchet action has been worked home on the bolt can be readily and easily loosened or worked off of the bolt, this being accomplished by the insertion of a suitable instrument or tool through the channel or groove 12 in the shank or stem 10 for the breaking or shearing off of the key 20 which frees the washer 17 for rotation on the bolt and likewise permits the turning off of the nut 13 therefrom.

The pawl or dog 16 due to its location on the washer 17 will be inaccessible when the nut 13 contacts with the washer 17 and the said pawl or dog is engaged with the teeth 15. Therefore, to loosen the nut when locked with the washer and the latter keyed to the bolt, it is necessary to break or shear the key 20 from the said washer 17 which key 20 engages in the key way 12 to prevent rotation of the washer upon the bolt and thus in this manner the nut can be unscrewed or worked off of the bolt.

Figure 6:
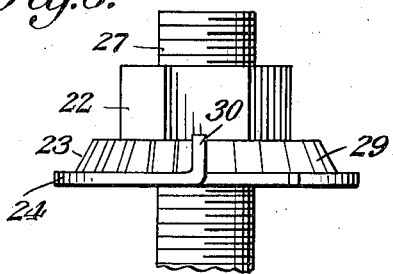
Figure 6 is a side elevation showing a modified form of nut lock.
Figure 7:
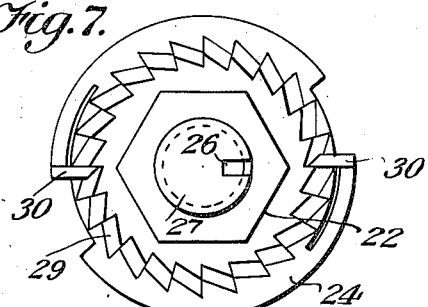
Figure 7 is a top plan view of the nut lock assembly.
Figure 8:
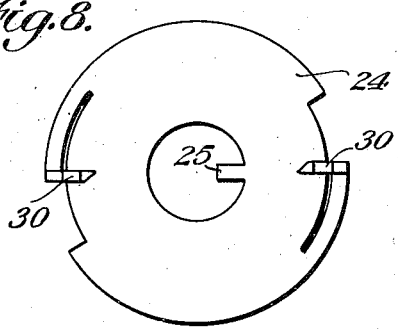
Figure 8 is a plan view of the washer employed in the modified form of nut lock.
Figure 9:
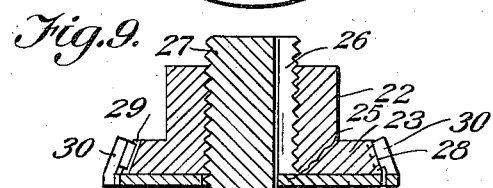
Figure 9 is a vertical longitudinal sectional view through the bolt and nut with the washer in association.

In Figures 6 to 9 of the drawing there is shown a modified form of nut lock wherein the nut 22 is formed with an enlarged circular inner end 23 adapted to lie next to a washer 24 keyed at 25 in the channel or groove 26 in the shank or stem 27 of the bolt and this end 23 at its outer peripheral edge is beveled at 28, said edge being also provided with ratchet teeth 29 while the washer has cut and bent peripherally therefrom springy ratchet acting pawls or dogs 30. These pawls or dogs 30 at their ratchet acting ends are bent over the beveled peripheral edge 28 of the enlarged end 23 of the nut 22 thus interfitting the washer and nut with each other without accidental separation thereof one from the other. The pawls or dogs 30 in this instance are two in number and are diametrically opposite each other yet a single pawl or dog may be substituted or a greater number created on the washer 24.

The washer 24 being slidably keyed with the shank or stem 27 of the bolt and the dogs or pawls 30 engaging the teeth 29 on the nut 22 causes the locking of the nut on the bolt and through ratchet action the nut can be adjusted in one direction for the tightening of the bolt and nut together in a piece of work. Should the bolt and nut be used in wood susceptible of shrinkage and if the latter occurs, there is no possibility of the accidental separation of the washer 24 from the nut 22 due to the overlapping of the pawls or dogs 30 onto the beveled periphery 28 of the nut 22 as the latter and the said washer are interfitted with each other against separation. When it is desired to free the nut, the pawls or dogs 30 are disengaged through the use of any suitable instrument or tool from the teeth 29 to free the nut for the turning thereof and the loosening of the same on the bolt or the turning of such nut therefrom.

What is claimed is:

A nut lock for a bolt having a longitudinal groove therein and a nut adjustable on said bolt, comprising a member loosely fitting said bolt and having a shearing projection engageable in said groove and accessible through said groove in an axial direction of the bolt, and ratchet means on said member and operating upon said nut, the said shearing projection having a weakened point, the said ratchet means being concealed between said member and the nut.

JULIUS V. UHERKOVICH.